US012510039B2

(12) United States Patent
Ferrari

(10) Patent No.: US 12,510,039 B2
(45) Date of Patent: Dec. 30, 2025

(54) SYSTEM FOR CHECKING A CORRECT MOUNTING OF A SENSOR

(71) Applicant: Liebherr-Components Colmar SAS, Colmar (FR)

(72) Inventor: Bryan Ferrari, Colmar (FR)

(73) Assignee: LIEBHERR-COMPONENTS COLMAR SAS, Colmar (FR)

( * ) Notice: Subject to any disclaimer, the term of this patent is extended or adjusted under 35 U.S.C. 154(b) by 0 days.

(21) Appl. No.: 18/433,024

(22) Filed: Feb. 5, 2024

(65) Prior Publication Data
US 2024/0287946 A1 Aug. 29, 2024

(30) Foreign Application Priority Data
Feb. 24, 2023 (DE) .................... 10 2023 104 554.7

(51) Int. Cl.
*F02D 41/22* (2006.01)
*F01N 11/00* (2006.01)
*G01M 15/10* (2006.01)

(52) U.S. Cl.
CPC ............ *F02D 41/222* (2013.01); *F01N 11/00* (2013.01); *G01M 15/102* (2013.01); *F01N 2560/026* (2013.01)

(58) Field of Classification Search
CPC .. F02D 41/222; F01N 11/00; F01N 2560/026; G01M 15/102
See application file for complete search history.

(56) References Cited

U.S. PATENT DOCUMENTS 9,670,817 B2 6/2017 Yoo et al.
11,447,124 B2 * 9/2022 Light-Holets ......... B60W 10/06
11,971,325 B2 * 4/2024 Cretin .................... F01N 11/00

FOREIGN PATENT DOCUMENTS

| CN | 107682467 A | 2/2018 |
| DE | 102016110167 A1 | 12/2016 |
| DE | 102017210315 A1 | 12/2018 |
| DE | 102017223890 A1 | 7/2019 |
| DE | 102018205082 A1 | 10/2019 |
| EP | 4141232 A1 | 3/2023 |

OTHER PUBLICATIONS

European Patent Office, Extended European Search Report Issued in Application No. 24151267.2, Jul. 3, 2024, Germany, 9 pages.
"Serial control and communications heavy duty vehicle Network—Top Level Document," SAE International, J1939-201808, Available as Early as Apr. 2000, 29 pages.

* cited by examiner

*Primary Examiner* — Gonzalo Laguarda
(74) *Attorney, Agent, or Firm* — McCoy Russell LLP

(57) ABSTRACT

The present disclosure relates to a system for checking a correct mounting of a plurality of sensors, in particular of sensors mounted in an engine system, comprising a controller configured to communicate with the plurality of sensors, wherein the controller is configured to control a switching on or off of the power supply to at least a sub-group of the sensors and to check whether a sensor whose power supply was switched on is communicating, wherein the system is configured such that at least two sensors are connected to a common power supply port and are therefore powered on or off at the same time, wherein the at least two sensors comprise at least two different types of sensors.

19 Claims, 6 Drawing Sheets

SYSTEM FOR CHECKING A CORRECT MOUNTING OF A SENSOR

CROSS REFERENCE TO RELATED APPLICATION

The present application claims priority to German Patent Application No. 10 2023 104 554.7 filed on Feb. 24, 2023. The entire contents of the above-listed application are hereby incorporated by reference for all purposes.

TECHNICAL FIELD

In many applications, an incorrect mounting of sensors which are of particular relevance, such as emission relevant sensors in an engine, should be either impossible or detected by the system.

BACKGROUND

One of the most efficient solutions for reaching Diesel Tier 4 emission standards is based on urea water solution injection into the exhaust line, which converts harmful nitrogen oxides into "harmless" molecules in catalysts. The amount of urea to be injected is estimated based on sensor information. In the same way, the emissions are measured with sensors of the same type. These sensors are the elements that guarantee emissions at any time.

SUMMARY

Thus, organizations for certifying engines such as the EPA require that the system can detect an installation error of such sensors (voluntary or not) if the error is possible.

The most commonly used solution is that a non-installation is detected and to make sure that physically a wrong installation is impossible (mainly mechanically).

The mix-up of the sensors is today usually made impossible by:
  an electrical information available in extra pins of the sensor;
  a physical key in the connector (common solution in the automotive industry) or
  software protection, for example using a model to check the consistency of the values.

These solutions become complex for a large number of sensors and might require changes on the sensor's side.

For example, a large diesel engine may require 6 sensors measuring NOx, 5 sensors measuring NH3. For this number of sensors, the coding of the connector or the addition of Pins become solutions either too complicated or too expensive.

Non post published document EP 4 141 232 A1 of the same applicant shows a system for checking a correct mounting of a plurality of sensors, comprising a controller configured for receiving signals from the plurality of sensors. The controller is configured to monitor a sequence and/or timing of the signals received from the sensors and to evaluate it with respect to a sequence and/or timing of a switching of a power supply to the sensors for checking the correct mounting of the sensors. However, for this system, a large number of control outputs of the controller are required, which are not usually available.

The object of the present disclosure is to find an improved system for checking a correct mounting of a plurality of sensors.

The present disclosure comprises a system for checking a correct mounting of a plurality of sensors, in particular of sensors mounted in an engine system, comprising a controller configured to communicate with the plurality of sensors, wherein the controller is configured to control a switching on or off of the power supply to at least a sub-group of the sensors and to check whether a sensor whose power supply was switched on is communicating, wherein the system is configured such that at least two sensors are connected to a common power supply port and are therefore powered on or off at the same time, wherein the at least two sensors comprise at least two different types of sensors.

The present disclosure therefore requires less control outputs of the controller because at least two sensors are connected to a common power supply port. Therefore, it is possible to implement the system with current engine controllers even if there are a larger number of sensors. Further, because sensors of different types are connected to the common power supply port, an incorrect mounting can be detected more easily at least in most cases.

In an embodiment of the present disclosure, the controller comprises a check-routine that consecutively checks all the sensors having a power supply port controlled by the controller by switching on the respective power supply port, checking whether the sensors connected to the power supply port are communicating, and switching off the power supply port if further sensors connected to another power supply port remain to be checked.

The present disclosure therefore avoids a possible non-detection of incorrectly mounted sensors that would occur if the power supply ports are switched on one after the other without switching the previously checked ports off again.

In an embodiment of the present disclosure, the plurality of sensors and preferably the at least two sensors connected to a common power supply port comprise at least one sensor that communicates cyclically and at least one sensor that communicates by interrogation.

By connecting two such sensors to a common power supply port, the different communication behavior can be used as an additional check for determining that the correct types of sensors have been mounted.

In an embodiment of the present disclosure, the controller is configured to detect the communication behavior of the sensors and to check whether sensors having the correct communication behavior are connected to the respective control port.

In an embodiment of the present disclosure, the controller is configured to check the sensors that communicate cyclically and the sensors that communicate by interrogation in alternation. Thereby, an interference between the communication of the sensors is avoided.

In an embodiment of the present disclosure, wherein the plurality of sensors and preferably the at least two sensors connected to a common power supply port comprise at least one sensor that communicates cyclically and at least two sensors that communicate by interrogation, wherein the controller is configured to check by interrogation whether a first sensor communicating by interrogation is communicating, to wait for a cyclic communication of the sensor that communicates cyclically and only then check by interrogation whether a second sensor communicating by interrogation is communicating. Again, an interference between the communication of the sensors is avoided.

In an embodiment of the present disclosure, at most one sensor that communicates cyclically is connected to any power supply port. Thereby, the check routine is simplified.

In an embodiment of the present disclosure, the plurality of sensors and preferably the at least two sensors connected to a common power supply port comprise at least one NOx sensor and at least one NH3 sensor.

In an embodiment of the present disclosure, the NOx sensors communicate by interrogation and the NH3 sensors communicate cyclically.

In an embodiment of the present disclosure, at least one of the at least two sensors connected to a common power supply port has a first pin select state and wherein at least one of the at least two sensors has a second pin select state. Thereby, the correct mounting of the sensors can be checked by checking the pin select state.

For example, the pin select state may determined by an extra pin provided on the sensor, which is, depending on the pin select state, connected to mass or not.

In an embodiment of the present disclosure, all the sensors connected to a common power supply port have a different ID. Thereby, a mix-up of sensors is more easily detected.

In a second aspect, the present application comprises a system for checking a correct mounting of a plurality of sensors, in particular of sensors mounted in an engine system, the system comprising a controller configured to communicate with the plurality of sensors, wherein the controller is configured to control a switching on or off of the power supply to at least a sub-group of the sensors and to check whether a sensor whose power supply was switched on is communicating, wherein at least one sensor and preferably at least two sensors have a power supply port that is switched on and off together with the controller.

According to the second aspect, less control outputs of the controller are required for checking the correct mounting, because at least one sensor is powered together with a switching on of the controller and therefore does not need a control output of the controller.

In particular, the at least one sensor may be connected to a power supply port that is powered by an activation signal for the controller. In particular, the activation signal may switch on operation of the controller when powered and switch off operation of the controller when not powered.

In an embodiment of the present disclosure, the power supply port of the at least one sensor is switched on when the ignition is turned on.

In an embodiment of the present disclosure, a check-routine of the controller stops and issues a warning once a mounting error of one of the sensors having a power supply port that is switched on together with the controller is detected.

The present disclosure thereby take into account that the power supply of the at least one sensor is not switched off again after the check. Therefore, if the entire check routine continues, a mix-up might not be reliably detected.

In an embodiment of the present disclosure, the first and the second aspect are combined. For example, at least two sensors of a different type are connected to a power supply port that is switched on together with a power supply of the controller and are therefore powered on together with the controller. Alternatively or in addition, at least two sensors of a different type are connected to a power supply port that is switched on an off by a control output of the controller.

In the following, preferred embodiments of the present disclosure applicable to both the first and the second aspect are described in more detail.

In an embodiment of the present disclosure, a check-routine of the controller consecutively checks all the sensors having a power supply port controlled by the controller and issues a common warning message containing all detected mounting errors of theses sensors after finishing the check-routine.

In an embodiment of the present disclosure, the controller is configured to monitor a sequence and/or timing of the signals received from the sensors and to evaluate it with respect to a sequence and/or timing of a switching of a power supply to the sensors for checking the correct mounting of the sensors.

In an embodiment of the present disclosure, the controller may be configured to switch on and off the power supply to the power supply ports and therefore the sensors connected to these power supply ports in a predetermined order. Further, the controller may be configured to check for each sensor whether it communicates when the power supply port to which it should be connected is switched on. If it does not communicate, a mounting error is detected.

In an embodiment, the checking of a correct mounting of a sensor comprises checking that the sensor is mounted at a correct mounting position out of a plurality of mounting positions, and in particular a check that the sensor is installed at the predefined position to which it is correlated and at which it should be installed for a correct mounting.

In an embodiment, the checking of a correct mounting of the plurality of sensors will detect a mix-up between the sensors, e.g. where at least two sensors have been mounted at incorrect mounting positions because the mounting positions have been mixed-up for the at least two sensors.

The present disclosure can be applied generally to any kind of sensors or applications.

In an embodiment of the present disclosure, the controller is used for checking a correct mounting of the plurality of sensors mounted in an engine, in particular an internal combustion engine.

As indicated above, the engine may comprise a plurality of mounting positions for mounting the plurality of sensors, such as different mounting positions on an element of the exhaust gas aftertreatment system, such as upstream and downstream of a catalyst, and/or positions on different elements of the exhaust gas aftertreatment system or engine body, such as different exhaust gas ducts arranged in series, to which sensors are mounted.

In an embodiment of the present disclosure, the plurality of sensors communicate with the controller over a bus system, wherein the bus system preferably is a CAN-bus system.

In an embodiment of the present disclosure, once a power supply to a sensor is switched on, it will communicate over the bus system. Once the power supply to a sensor is switched off, it will stop communicating over the bus system. The communication or stop in communication may be detected by the controller.

In an embodiment of the present disclosure, the plurality of sensors are sensors arranged on an exhaust gas aftertreatment system of the engine.

The present disclosure further comprises an engine comprising a plurality of sensors and a system as described above.

The present disclosure further comprises a method for checking a correct mounting of a plurality of sensors, the sensors preferably mounted in an engine system, the method comprising controlling a switching on or off of the power supply to at least a sub-group of the sensors and checking whether a sensor whose power supply was switched on is communicating;

According to a first aspect of the method, at least two sensors are connected to a common power supply port and are therefore powered on or off at the same time, wherein the at least two sensors comprise at least two different types of sensors.

According to a second aspect of the method, at least one sensor and preferably at least two sensors have a power supply port that is switched on together with a power supply of the controller and are therefore powered on together with the controller.

The methods of the present disclosure have the advantages already described above with respect to the inventive systems.

In an embodiment of the present disclosure, the methods of the present disclosure use a system as described above and/or operate as described above with respect to the system.

The present disclosure will now be described in more detail with respect to embodiments and figures.

DETAILED DESCRIPTION

The general goal of the inventive strategy is to detect as soon as possible a potential inversion between sensors, in particular exhaust gas sensors (such as NOx and NH3 sensors) installed on an exhaust gas aftertreatment system of an engine, in order to ensure an optimized exhaust gas treatment.

Figure 1:
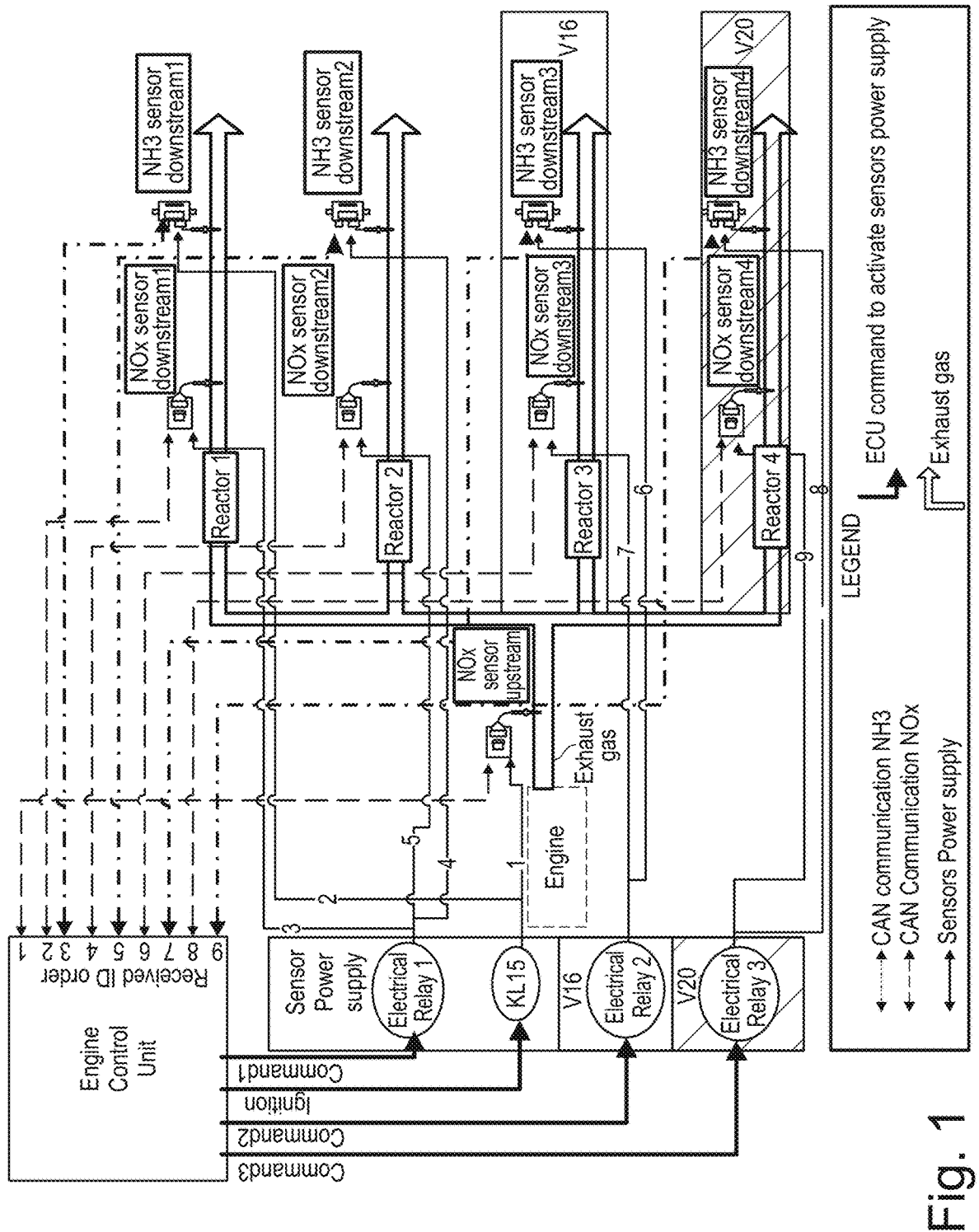
FIG. 1: a schematic drawing showing an embodiment of an inventive engine equipped with an inventive system.

FIG. 1 shows an embodiment of an inventive engine equipped with an inventive system. In particular, the exhaust gas aftertreatment system of the engine comprises an exhaust gas duct having several parallel paths, with a reactor, in particular an SCR catalyst, provided in each of the parallel paths. In the embodiment, four paths are provided, equipped with reactors 1 to 4. The present disclosure could also be applied to exhaust gas aftertreatment system with any other number of parallel paths.

A plurality of sensors is provided on the exhaust gas duct at predetermined positions in order to be able to control reductant injection for each of the reactors separately. The sensors communicate with a controller, in particular an ECU (engine control unit), by a serial bus such as a CAN bus.

In the embodiment shown, an NOx sensor is connected to a common exhaust gas duct of all the reactors upstream of the reactors. Further, for each reactor, an NOx sensor and an NH3 sensor is provided downstream of the respective reactor in the respective exhaust gas duct. The controller uses the sensor signals of the downstream sensors to separately control the exhaust gas aftertreatment in the respective reactor and in particular to control reductant injection into the respective exhaust gas stream.

Each sensor has a specific position at which it is to be mounted, corresponding to a position programmed into the software of the controller, such that measuring values provided by a sensor are correctly interpreted by the controller. For a correct mounting, each sensor therefore has to be mounted in the correct position on the exhaust gas aftertreatment system.

For example, in the system as shown in FIG. 1, the NOx sensor downstream 1 has to be fixed on the downstream side of SCR reactor 1 and it is the same logic for all other sensors.

The controller is coupled with electrical relays in order to switch the power supply of the sensors on and off and comprises a software routine that will check if the sensors are respectively positioned on the correct position, i.e. the correct SCR reactor, by checking whether a sensor that should be powered with a correct mounting is actually communicating.

As shown in FIG. 1, in the embodiment, the sensors NOx upstream and NH3 downstream 1 are connected to power supply port KL15, which is the controller activation signal. Details of this configuration will be described later on.

The sensors NOx downstream 1, NOx downstream 2 and NH3 downstream 2 are connected to a common power supply port that is switched on an off by relay 1.

The sensors NH3 downstream 3 and NOx downstream 3 are connected to a common power supply port that is switched on an off by relay 2.

The sensors NH3 downstream 4 and NOx downstream 4 are connected to a common power supply port that is switched on an off by relay 3.

The relays 1 to 3 are controlled by control outputs of the controller and are thereby switched on an off by the controller according to the check routine.

The system is adapted to be used with engines of different sizes. In particular, for a V12 engine, only two parallel exhaust gas ducts are present, and therefore only reactors 1 and 2 with the respective sensors. The check routine therefore ends after the check 5 indicated in FIG. 1.

For a V16 engine, three parallel exhaust has ducts are used, with reactors 1 to 3 with their respective sensors. The check routine therefore ends after the check 7 indicated in FIG. 1.

For a V20 engine, all four parallel exhaust has ducts are used, with reactors 1 to 4 with their respective sensors. The check routine therefore ends after the check 9 indicated in FIG. 1.

Before the specifics of the operation of the system shown in FIG. 1 are explained, we will first describe some fundamental properties of the system.

The disclosure is implemented to take into account a standard behavior of CAN buses such as CAN J1939 that as soon as a CAN device is powered, its corresponding information is sent to the controller and the controller can communicate with the CAN device. There is a CAN sensor particularity that is equally taken into account:

Some devices send their own information by request: this kind of device needs a request from the controller in order to give information. For example, the NOx sensor might communicate in this way, i.e. by interrogation.

Some devices send their own information by cycle; this kind of device sends its information every XXX ms as soon as the power supply is ON. For example, the NH3 sensor might communicate in this way, i.e. cyclically.

The controller is in particular configured to check this communication behavior in order to differentiate what kind of sensors are connected or not.

In order to distinguish which sensor is plugged in which reactor, the present disclosure uses switching of the power supply to the sensors. In order to avoid the reception of information from all sensors (NOx and NH3) at the same time, and to be able to know the reception order, the software strategy of the controller will activate the electrical relays that switch the power supply ports on and off one after the other.

Therefore, this strategy handles the electrical command relays in a precise order. The strategy is thereby able to identify a sensor which is not well mounted.

However, the CAN J1939 behavior implies that a device is always present on the CAN network as long as the device is powered. So in case of sensor inversion, only one of the two sensor will be detected as bad if the power supply ports are switched on one after the other without switching them off again after the check. In other words, sequencing the power supply of the sensors through the relays is not sufficient and one or several sensor inversions might not be detected. This is exemplified by FIG. 2 and FIG. 3.

Figure 2:
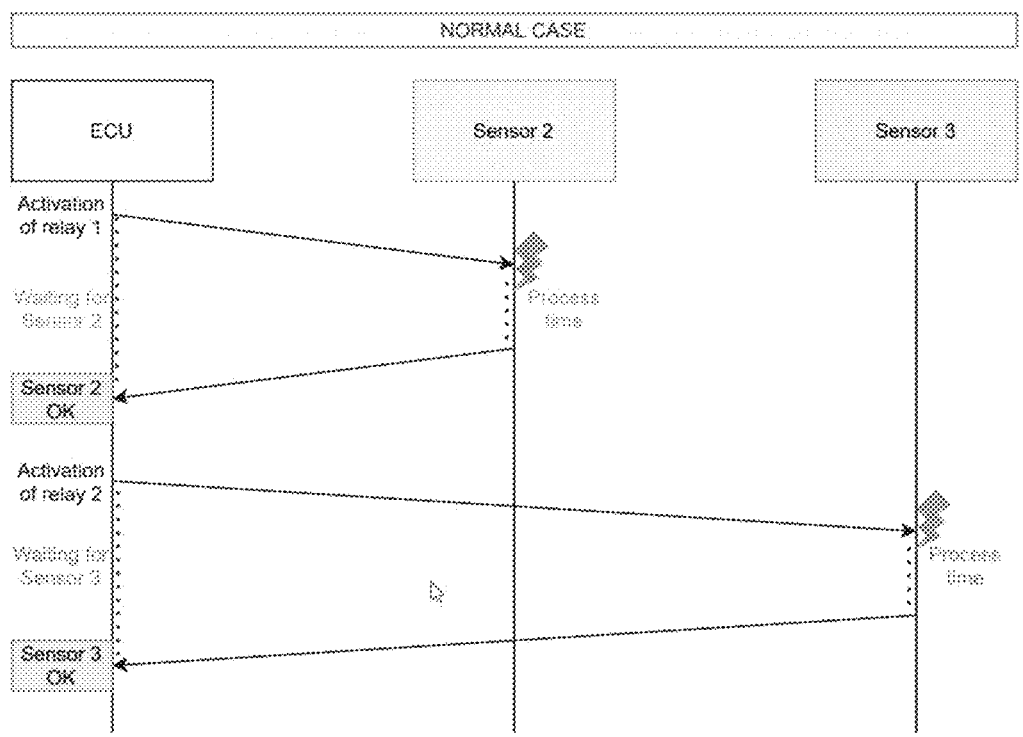
FIG. 2: a diagram showing the checking of two sensors connected to separate power supply ports in case of a correct mounting.

FIG. 2 shows the case where both sensor 2 and sensor 3 are correctly mounted and connected to power supply ports switched by relays 1 and 2, respectively.

As shown in FIG. 2, the controller is configured to switch relay 1 on and to check whether sensor 2 is communicating. Then, the controller switches on relay 2 and checks whether sensor 3 is communicating. Because the controller in each case receives a message from a sensor within the expected time frame, it concludes that the sensors are correctly mounted.

Figure 3:
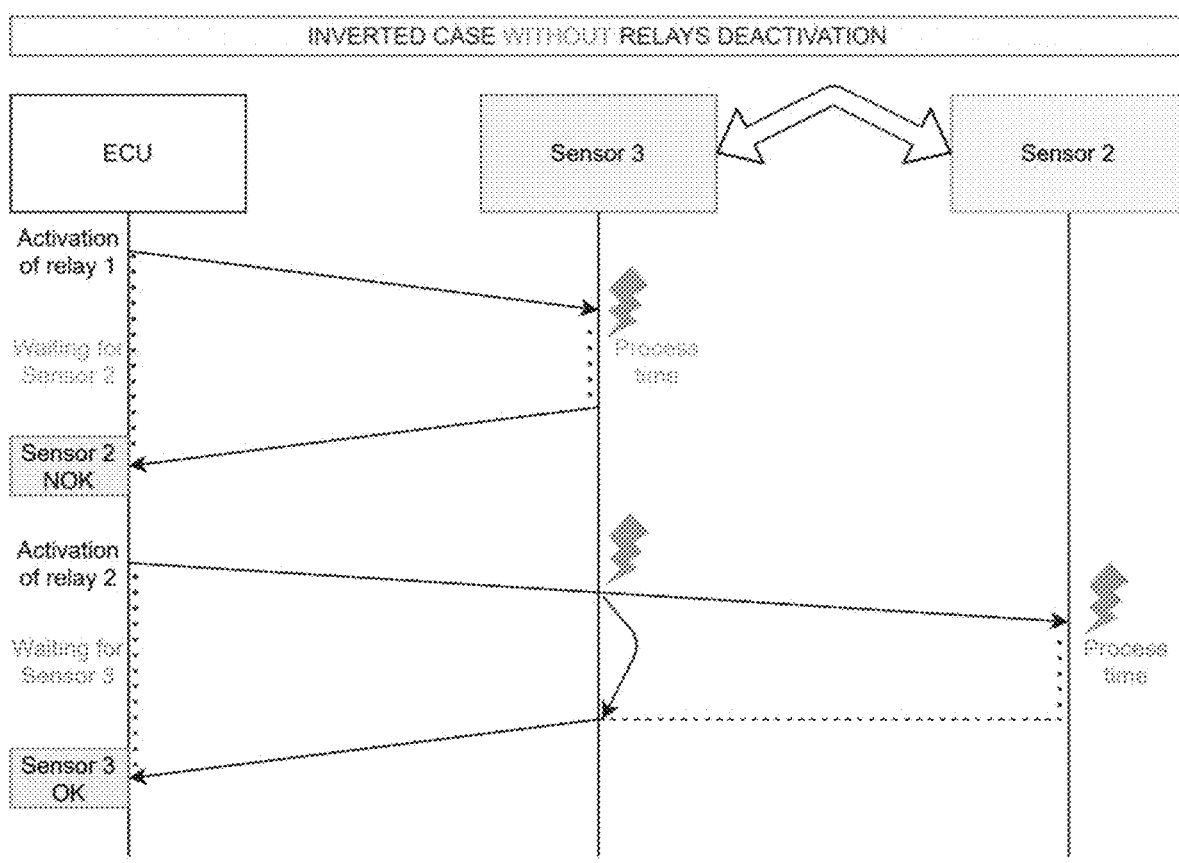
FIG. 3: a diagram showing the checking of two sensors connected to separate power supply ports in case of an incorrect mounting in a case where the power supply port for the first sensor is not switched off after the check.
Figure 4:
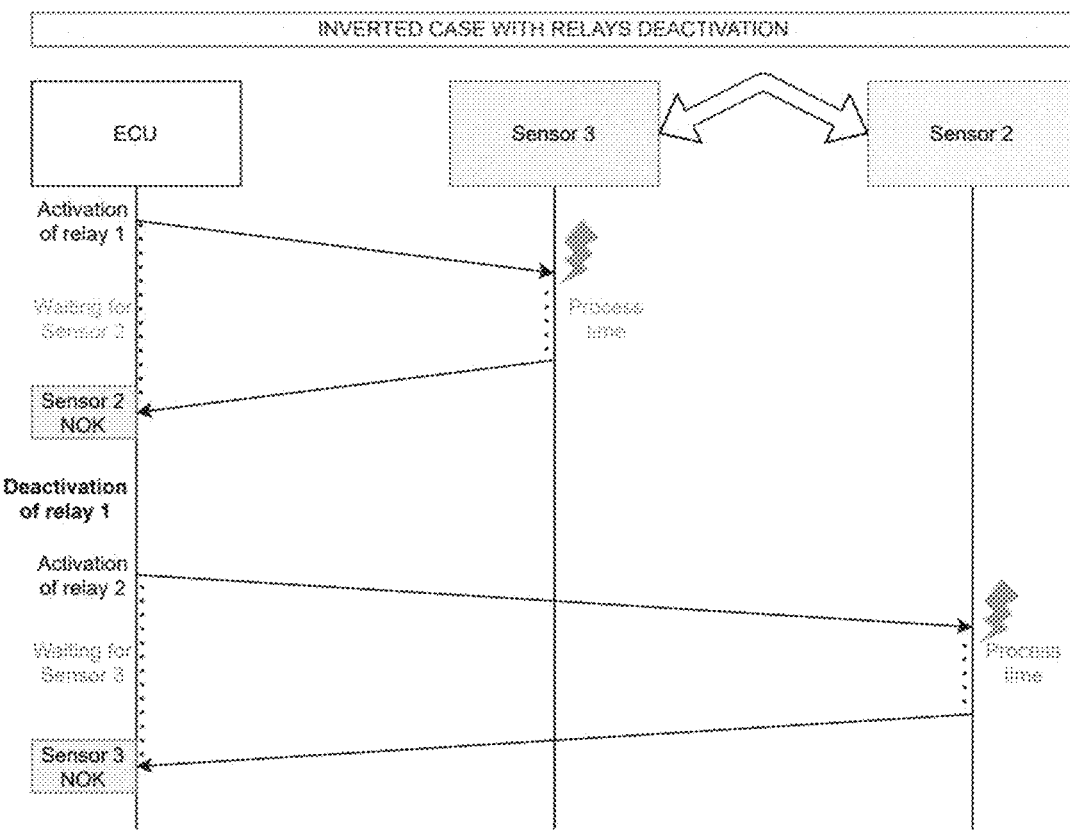
FIG. 4: a diagram showing the checking of two sensors connected to separate power supply ports in case of an incorrect mounting in a case where the power supply port for the first sensor is switched off after the check.

FIGS. 3 and 4 show the same basic situation, but with sensor 2 and 3 being inverted and therefore incorrectly mounted. Therefore, relay 1 will power sensor 3 instead of sensor 2 and relay 2 will power sensor 2 instead of sensor 3.

FIG. 3 shows the result of the check routine if the electrical relay that is powered first is not deactivated after the check on the respective sensor has been performed:

1. Activation of relay 1.
   Sensor 3 powered instead of sensor 2.
   Sensor 2 is not communicating and therefore seen by the controller as absent and thus badly positioned.

2. Activation of relay 2.
   Sensor 2 powered instead of sensor 3.
   However, sensor 3 is still powered by relay 1 from the previous phase.
   Therefore, sensor 3 is still communicating with the controller.
   Sensor 3 is seen by the controller as present and thus well positioned.

Therefore, on two badly positioned sensors, only one is seen to be wrong.

In order to avoid this situation, in a preferred embodiment, the controller deactivates the relays after the checking phase.

The resulting check routine (with deactivation of the electrical relay) is shown in FIG. 4:

1. Activation of relay 1.
   Sensor 3 powered instead of sensor 2.
   Sensor 2 seen absent by the controller and thus badly positioned.
2. Deactivation of relay 1.
   Sensor 3 not powered instead of sensor 2.
3. Activation of relay 2.
   Sensor 2 powered instead of sensor 3.
   Sensor 3 seen absent by the controller and thus incorrectly positioned.
4. Reactivation of relay 1
   Sensor 3 powered instead of sensor 2.
   Sensor 2 powered instead of sensor 3.

On two wrongly positioned sensors, both are seen wrong by the controller. Therefore, for the relays controlled by the controller, the relay is switched off again before the next check is performed.

In the above examples, more than one sensor can be connected to each relay. In this case, additional functionality is provided by the present disclosure.

The following table shows an example of correspondence between calibration and physical placement of sensors in the embodiment of a system as shown in FIG. 1:

| Sensor check number | Physical sensor | Calibration | Comment |
| --- | --- | --- | --- |
| Sensor check 1 | NOx sensor upstream | NOX_UPSTREAM_ENGINE | Alternate NOx and NH3 when both sensor type are onto the application |
| Sensor check 2 | NH3 sensor downstream 1 | NH3_DOWNSTREAM_REACTOR_1 | |
| Sensor check 3 | NOx sensor downstream 1 | NOX_DOWNSTREAM_REACTOR_1 | |
| Sensor check 4 | NH3 sensor downstream 2 | NH3_DOWNSTREAM_REACTOR_2 | |
| Sensor check 5 | NOx sensor downstream 2 | NOX_DOWNSTREAM_REACTOR_2 | |
| Sensor check 6 | NH3 sensor downstream 3 | NH3_DOWNSTREAM_REACTOR_3 | |
| Sensor check 7 | NOx sensor downstream 3 | NOX_DOWNSTREAM_REACTOR_3 | |
| Sensor check 8 | NH3 sensor downstream 4 | NH3_DOWNSTREAM_REACTOR_4 | |
| Sensor check 9 | NOx sensor downstream 4 | NOX_DOWNSTREAM_REACTOR_4 | |

The customers are informed of the sensor positioning corresponding to the software calibration. The software will then check the correct mounting according to the software calibration.

Figure 6:
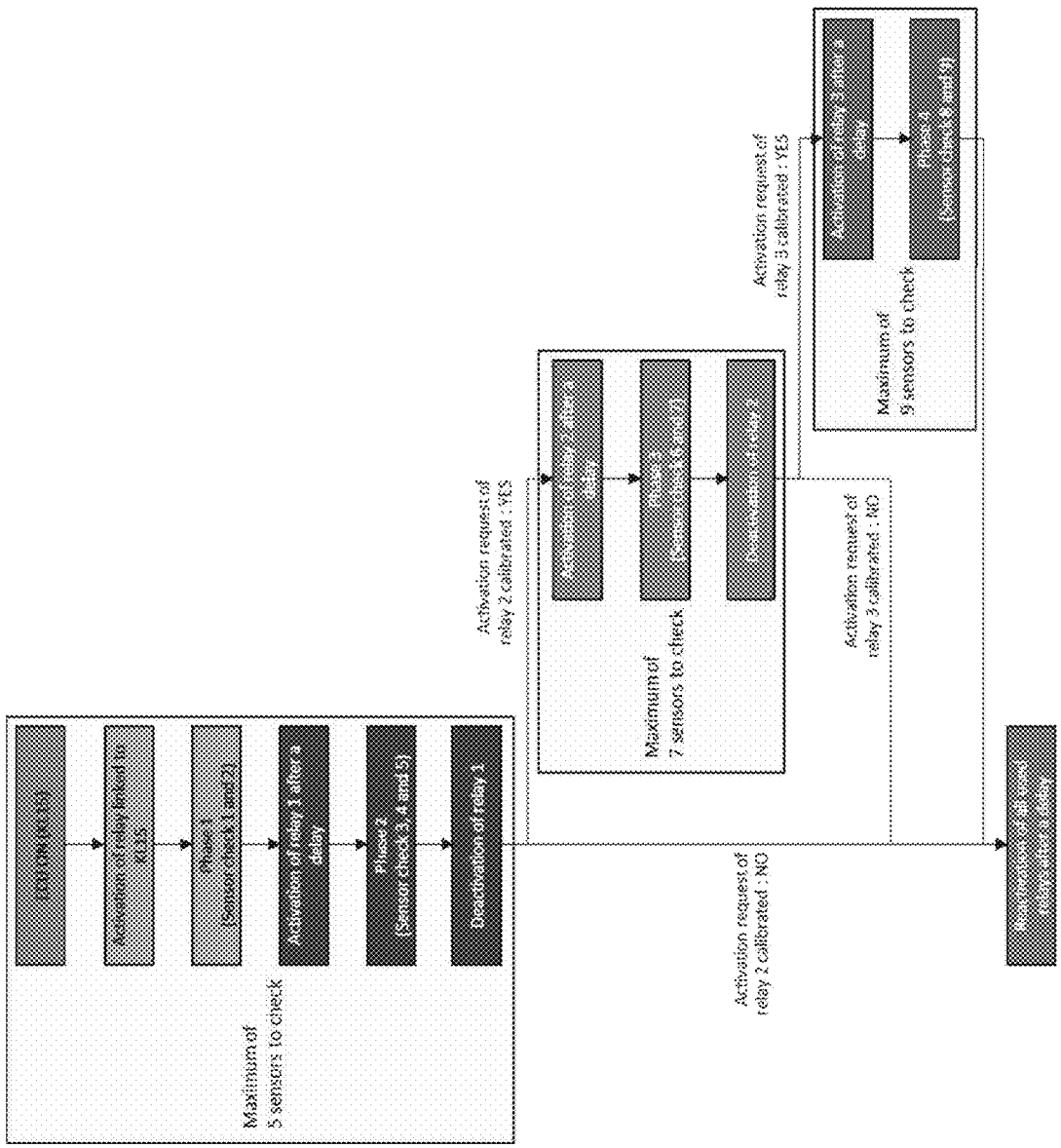
FIG. 6: a diagram showing the checking routine for all the sensors of the embodiment shown in FIG. 1.

The check routine comprises several phases, as shown in FIG. 6:

After activation of KL15, sensors 1 and 2 are checked. As KL15 is the ECU activation signal, it cannot be deactivated because otherwise the ECU is switched off. Without the ECU activation signal, the ECU is only power supplied but not processing.

So all the checks, also those following sensors checks 1 and 2, are done with KL15 activated but only the sensor checks 1 and 2 are linked to this signal. If a mis-positioning is detected at this stage, the check routine is interrupted and a warning message is issued, prompting the user to check sensors 1 and 2 and to correct the mis-positioning before the check-routine is started again or continued for the remaining sensors.

Therefore, if a positioning error is seen on the sensor checks 1 or 2, the strategy "breaks" which means that it is stopped and an error is risen. Then the customer has to correct the sensor 1 and 2 positions, and switch on the ECU again in order to continue the check for all other sensors. In other words, the strategy is only complete after a minimum of 2 ECU power on if a positioning error is present on sensor check 1 or 2. This implementation is used in order to cope with a lack of free pins on the controller.

After activation of relay 1, sensors 3, 4 and 5 are checked. Then, relay 1 is switched off before relay 2 is switched on and sensors 6 and 7 are checked. Then, relay 2 is switched off before relay 3 is switched on and sensors 8 and 9 are checked.

In the above method, because more than one sensor is connected to each relay, an inversion for sensors on the same relay cannot be detected by switching power on and off. However, some additional measures help to improve the checking functionality.

In particular, a sensor ID is given to a group of two sensors that can be differentiated by the SW by wiring. For the same ID, a pin select (adding an electrical mass) changes the source address of the sensor. This can for example be done for the NOx sensors.

| ID | Sensor without pin select | Sensor with pin select |
|---|---|---|
| X | NOx upstream | NOx downstream 1 |
| Y | NOx downstream 2 | NOx downstream 3 |
| Z | NOx downstream 4 | NOx downstream 5 |

Therefore, according to a predefined correct mounting that is checked by the controller, relays are connected onto the sensors according to the rule that two sensors cannot be connected to the same electrical relay if their ID is the same.

This will for example result in the following strategy for the NOx-Sensors:

| Phase (represented by relay) | Sensor check number | Physical sensor | Calibration |
|---|---|---|---|
| 1 | Sensor check 1 | NOx upstream | NOX_UPSTREAM_ENGINE |
|   | Sensor check 2 | NOx downstream 3 | NOX_DOWNSTREAM_REACTOR_3 |
| 2 | Sensor check 3 | NOx downstream 2 | NOX_DOWNSTREAM_REACTOR_2 |
|   | Sensor check 4 | NOx downstream 1 | NOX_DOWNSTREAM_REACTOR_1 |
| 3 | Sensor check 5 | NOx downstream 4 | NOX_DOWNSTREAM_REACTOR_4 |

In this way, the positioning error is physically limited, and the strategy helps to detect an inversion.

Further, the SW strategy can also detect an inversion between NH3 and NOx sensors due to the different communication behavior. Therefore, only one NH3 sensor is connected to each power supply port.

Figure 5:
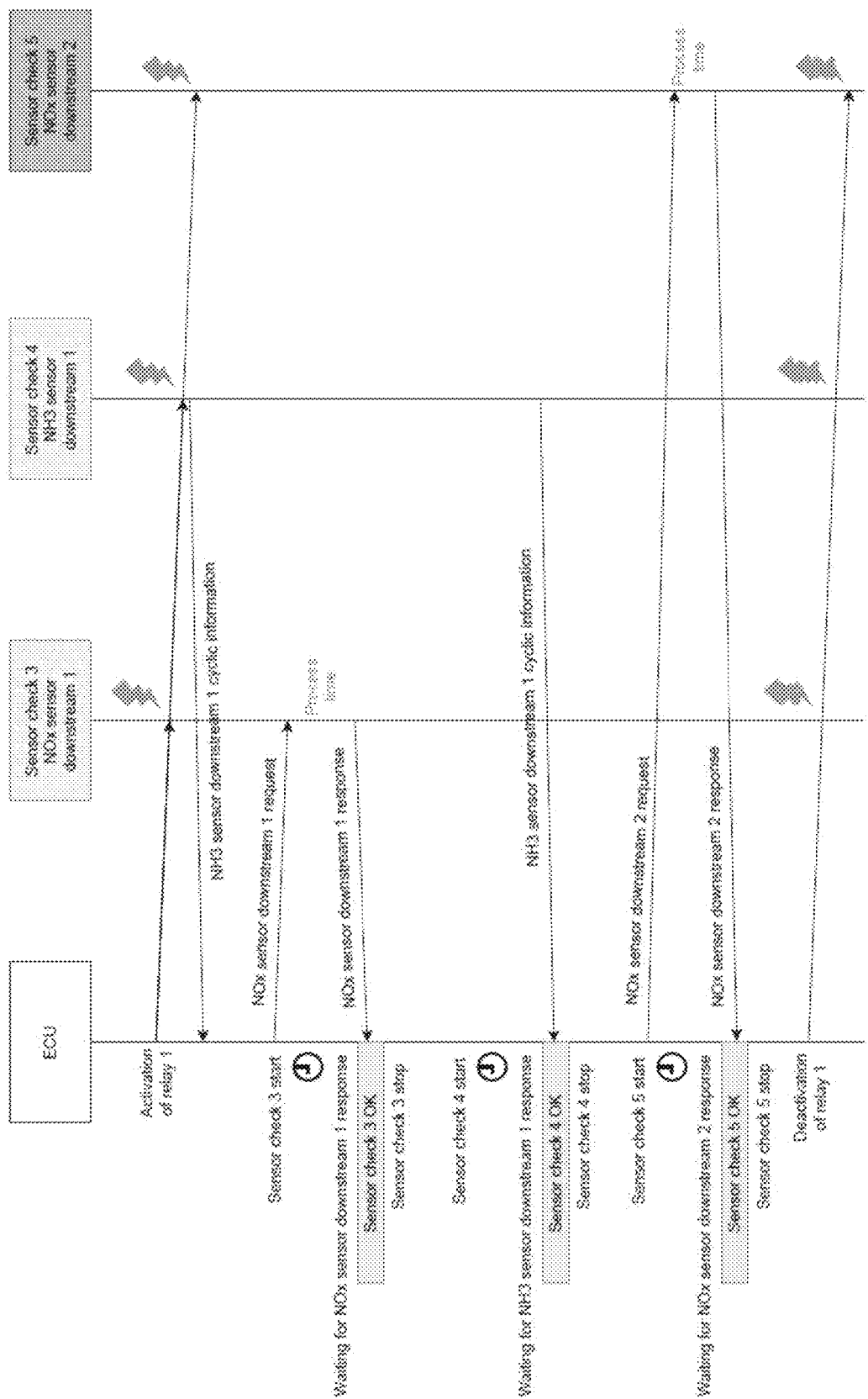
FIG. 5: a diagram showing the checking of three sensors connected to a common power supply port, wherein one of the sensors communicates cyclically.

Further, as shown in FIG. 5, if two NOx-sensors are connected to a power supply port together with an NH3 sensor, the first NOx-sensor is checked, then the software routine waits for the next cyclic communication by the NH3 sensor and then the next NOx sensor is checked. Therefore, between two checks on the NOx sensors, the controller waits for a communication from the NH3 sensor in order to avoid that the check on the second NOx sensor is corrupted by the cyclic communication by the NH3 sensor. The NH3 sensor can be checked on any receipt of a cyclic message.

Further, on a more general level, NOx sensors and NH3 sensors can be checks in alternation. The reason is to avoid a NH3 sensor answer in place of another NH3 sensor as they send cyclic message. The alternating order makes sure that there is a NOx sensor between two NH3 sensors which sends its information after a request.

The check routine of the present disclosure is particularly robust and fast because it checks a predetermined configuration. In this way, the controller searches for what is expected in case of a correct mounting and if it does not receive the expected answer after a certain amount of time knows that there is a mounting error for this position, and can remove an unknown parameter from the equation.

The invention claimed is:

1. A system for checking a correct mounting of a plurality of sensors, comprising a controller configured to communicate with the plurality of sensors,
   wherein at least a first sub-group of the plurality of sensors is connected to a power supply line via a first switch,
   wherein the controller is configured to control the first switch for switching on or off of a power supply to the first sub-group and to check whether a sensor out of the first sub-group whose power supply was switched on by the controller controlling the first switch is communicating in order to verify the correct mounting of the sensor,
   wherein the system is configured such that at least two sensors are connected to a common power supply port and are therefore powered on or off at the same time,
   wherein the at least two sensors comprise at least two different types of sensors,
   wherein the system comprises at least a second switch controlled by the controller, wherein at least a second sub-group of the plurality of sensors is connected to the power supply line via the second switch, wherein the controller is configured to consecutively check the first and the second sub-group of the plurality of sensors by sequentially performing the following steps in order to avoid interference of the first sub-group of the plurality of sensors with the second sub-group of the plurality of sensors;
switching on the first switch,
checking whether the first sub-group of the plurality of sensors connected to the power supply line via the first switch are communicating,
switching off the first switch,
switching on the second switch, and
checking whether the second sub-group of the plurality of sensors connected to the power supply line via the second switch are communicating.

2. The system of claim 1, wherein the plurality of sensors and preferably the at least two sensors connected to the common power supply port comprise at least one NOx sensor and at least one NH3 sensor.

3. The system of claim 1, wherein all the sensors connected to the common power supply port have a different ID.

4. The system of claim 1, wherein a check-routine of the controller consecutively checks all the sensors having a power supply port controlled by the controller and issues a common warning message containing all detected mounting errors of theses sensors after finishing the check-routine.

5. The system of claim 1, wherein the plurality of sensors communicate with the controller over a bus system.

6. The system of claim 1, wherein the plurality of sensors are sensors arranged on an exhaust gas aftertreatment system of an engine system.

7. An engine comprising the plurality of sensors and the system of claim 1.

8. A system for checking a correct mounting of a plurality of sensors, comprising a controller configured to communicate with the plurality of sensors,
wherein the controller is configured to control a switching on or off of a power supply to at least a sub-group of the sensors and to check whether a sensor whose power supply was switched on is communicating,
wherein the system is configured such that at least two sensors are connected to a common power supply port and are therefore powered on or off at the same time,
wherein the at least two sensors comprise at least a first sensor of a first communication type and at least a second sensor of a second communication type, the first communication type and the second communication type differing from each other,
wherein the first sensor is configured to communicate cyclically by regularly sending out, when powered on, information to the controller on its own motion, and
the second sensor is configured to communicate only by interrogation by sending out, when powered on, information only in reply to receiving a request from the controller.

9. The system of claim 8, wherein the plurality of sensors comprise at least one first sensor that communicates cyclically and at least two second sensors that communicate by interrogation, wherein the controller is configured to check by interrogation whether one of the second sensors communicating by interrogation is communicating, to wait for a cyclic communication of the first sensor that communicates cyclically and only then check by interrogation whether another one of the second sensors communicating by interrogation is communicating.

10. The system of claim 8, wherein at most one first sensor that communicates cyclically is connected to any power supply port.

11. The system of claim 8, wherein the controller is configured to check the first sensor that communicates cyclically and the second sensor that communicates by interrogation in alternation.

12. An engine comprising the plurality of sensors and the system of claim 8.

13. A system for checking a correct mounting of a plurality of sensors, comprising a controller configured to communicate with the plurality of sensors,
wherein the controller is configured to control a switching on or off of a power supply to at least a sub-group of the sensors and to check whether a sensor whose power supply was switched on is communicating,
wherein the system is configured such that at least two sensors are connected to a common power supply port and are therefore powered on or off at the same time,
wherein the at least two sensors comprise at least two different types of sensors, wherein at least one of the at least two sensors connected to the common power supply port has a first pin select state and wherein at least one of the at least two sensors has a second pin select state.

14. An engine comprising the plurality of sensors and the system of claim 13.

15. A system for checking a correct mounting of a plurality of gas sensors, the system comprising a controller configured to communicate with the plurality of gas sensors,
wherein at least a first sub-group of the plurality of gas sensors is connected to a power supply line via a first switch,
wherein the controller is configured to control the first switch for switching on or off of a power supply to the first sub-group and to check whether a gas sensor out of the first sub-group whose power supply was switched on by the controller controlling the first switch is communicating in order to check the correct mounting of the gas sensor,
wherein a third sub-group of the plurality of gas sensors comprises at least one gas sensor that has a power supply port that is switched on and off together with the controller.

16. The system of claim 15, wherein a check-routine of the controller stops and issues a warning once a mounting error of one of the gas sensors of the third sub-group is detected.

17. The system of claim 15, wherein a second sub-group of the plurality of sensors comprises at least two sensors.

18. An engine comprising the plurality of sensors and the system of claim 15.

19. A method for checking a correct mounting of a plurality of sensors, the method comprising:
controlling, by a controller, a switching on or off of a power supply to at least a sub-group of the sensors by switching on or off a first switch connecting a power supply port of the at least a sub-group with a power supply line; and
checking, by the controller, whether a sensor of the first sub-group with a power supply line whose power supply was switched on by the controller switching on the first switch is communicating;
wherein
at least two sensors are connected to a common power supply port and are therefore powered on or off at the same time, wherein the at least two sensors comprise at least two different types of sensors, the method further comprising:

consecutively checking, by the controller, the first sub-group of the plurality of sensors and a second sub-group of the plurality of sensors, the second sub-group of the plurality of sensors being connected to the power supply line via a second switch controlled by the controller, by sequentially performing the following steps in order to avoid interference of the first sub-group of the plurality of sensors with the second sub-group of the plurality of sensors:

switching on the first switch, checking whether the first sub-group of the plurality of sensors connected to the power supply line via the first switch are communicating, switching off the first switch, switching on the second switch, and checking whether the second sub-group of the plurality of sensors connected to the power supply line via the second switch are communicating.

* * * * *